US007269827B2

(12) United States Patent
Metzger

(10) Patent No.: US 7,269,827 B2
(45) Date of Patent: Sep. 11, 2007

(54) METHOD AND APPARATUS FOR COMPILING CODE

(75) Inventor: Markus T. Metzger, Neu-Ulm (DE)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 10/274,572

(22) Filed: Oct. 21, 2002

(65) Prior Publication Data

US 2004/0078791 A1   Apr. 22, 2004

(51) Int. Cl.
*G06F 9/45* (2006.01)
*G06F 9/30* (2006.01)

(52) U.S. Cl. .................. 717/151; 717/152; 717/159; 712/216

(58) Field of Classification Search ................ 717/151, 717/152, 159; 712/216
See application file for complete search history.

(56) References Cited

U.S. PATENT DOCUMENTS

| 5,428,793 | A | * | 6/1995 | Odnert et al. ................ 717/157 |
| 5,526,499 | A | * | 6/1996 | Bernstein et al. ............ 712/216 |
| 5,664,193 | A | * | 9/1997 | Tirumalai .................... 717/153 |
| 5,768,595 | A | * | 6/1998 | Gillies ........................ 717/159 |
| 5,809,308 | A | * | 9/1998 | Tirumalai .................... 717/156 |
| 5,835,776 | A | * | 11/1998 | Tirumalai et al. ............ 717/159 |
| 5,854,933 | A | * | 12/1998 | Chang ......................... 717/158 |
| 5,894,576 | A | * | 4/1999 | Bharadwaj ................... 717/156 |
| 5,903,761 | A | * | 5/1999 | Tyma .......................... 717/154 |
| 6,260,190 | B1 | * | 7/2001 | Ju .............................. 717/156 |
| 6,571,215 | B1 | * | 5/2003 | Mahapatro ................... 717/101 |
| 2005/0039167 | A1 | * | 2/2005 | Fernandes et al. ........... 717/116 |

OTHER PUBLICATIONS

Kurlander et al., "Efficient Instruction Scheduling for Delayed-Load Architectures", 1995, ACM, p. 740-776.*
Bacon et al., "Compiler Transformations for High-Performance Computing", 1994, ACM, p. 345-420.*
*Mutation Scheduling: A Unified Approach to Compiling for Fine-Grain Parallelism*; by Steven Novack and Alexandru Nicolau, Department of Information and Computer Science, University of California, Irvine, CA 92717, 1994.
*URSA: A Unified ReSource Allocator for Registers and Functional Units In VLIW Architectures*; by David A. Berson, Rajiv Gupta and Mary Lou Soffa, Department of Computer Science, University of Pittsburgh, PA 15260; Dec. 1992.

* cited by examiner

*Primary Examiner*—Wei Zhen
*Assistant Examiner*—Qamrun Nahar
(74) *Attorney, Agent, or Firm*—Trop, Pruner & Hu, P.C.

(57) ABSTRACT

The method and apparatus for compiling high level code is described. A method may be utilized that may include integrating the allocation of registers, scheduling instructions, and selecting code functions to produce an intermediate representation of a high level code segment with scheduled instructions. Additionally, a modular conflict handler may be utilized to resolve register and/or scheduler conflicts as may be required or useful in compiling the high level code. Also, a modular transformation interface may be utilized to invoke analyzers as may be required or useful to generate a compiled version of the high level code.

26 Claims, 7 Drawing Sheets

METHOD AND APPARATUS FOR COMPILING CODE

FIELD OF THE INVENTION

This disclosure relates to the field of computer processing and, more specifically, to a method and apparatus for compiling code.

BACKGROUND

Compilers are utilized to convert higher level programming instructions to instructions that may be executed on a particular target computer architecture. As the architectures of microprocessors and other processors have improved over the years, increased demands have been placed on compilers to convert high level code to code that may be efficiently executed on a particular architecture.

Modern processor architectures have deeply nested pipe lines, multiple functional units, and instruction sets that are sophisticated. These architectures may allow for speed improvements over prior generation processors, but may also benefit from optimizing compilers designed to exploit the advantages of the architecture.

Therefore, what is needed in the industry is a compiler that may be adapted to exploit the advantages of particular processor architectures and provide other benefits.

BRIEF DESCRIPTION OF THE DRAWINGS

The invention may be best understood by referring to the following description and accompanying drawings that are used to illustrate embodiments of the invention.

DETAILED DESCRIPTION

In the following description, numerous specific details are set forth to provide a detailed understanding of the present invention. However, one skilled in the art will readily appreciate that the present invention may be practiced without these specific details. For example, the described code segments are provided by way of example and not by way of limitation, as other programming structures may be similarly utilized.

Figure 1:
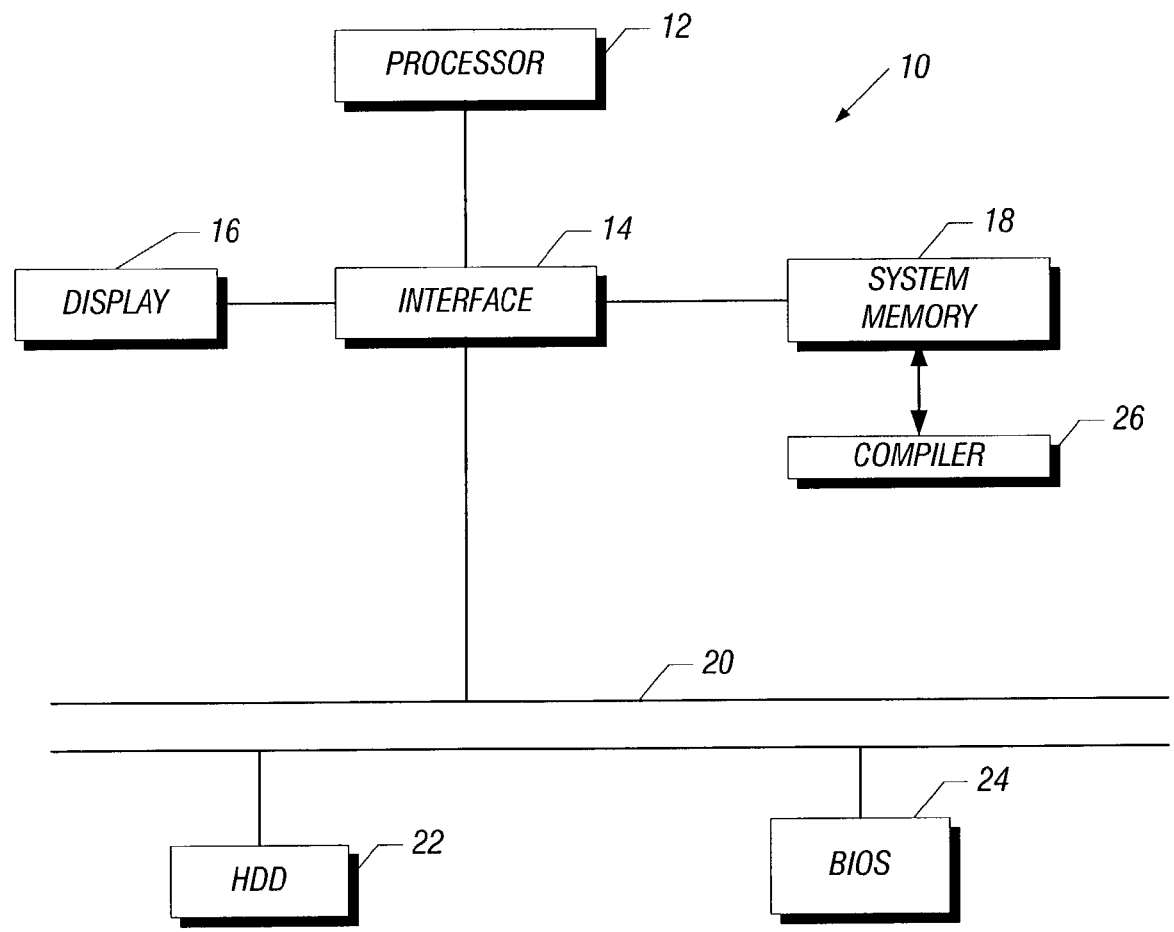
FIG. 1 is a schematic depiction of a processor-based system in accordance with one embodiment of the present invention.

Referring to FIG. 1, a processor-based system 10 may include a processor 12 coupled to an interface 14. The interface 14, which may be a bridge, may be coupled to a display 16 or a display controller (not shown) and a system memory 18 that may include dynamic random access memory (DRAM). The interface 14 may also be coupled to one or more buses 20. The bus 20, in turn, may be coupled to one or more storage devices 22, such as a hard disk drive (HDD). The hard disk drive 22 may store a variety of software, including source programming code (not shown), compiler 26, and other programming code. A basic input/output system (BIOS) memory 24 may also be coupled to the bus 20 in some embodiments. Of course, a wide variety of other processor-based system architectures may be utilized.

In some embodiments, the compiler 26 may be stored on hard disk 22 and may be subsequently loaded into system memory 18. The processor 12 may then execute instructions that cause the compiler 26 to operate.

The compiler 26 may operate to compile high level code into a lower level code that may be executable on a computation device such as, for example, a processor. The compiler may be implemented with modular sections that may include conflict strategies as described below. The strategies may be selected from a variety of strategies when the compiler is built or may be selected by a user as may be described subsequently. In like manner, a transformation interface may be provided that may provide an interface for modular analyzers that may also be selected when the compiler is built or may be selected by a user.

Figure 2:
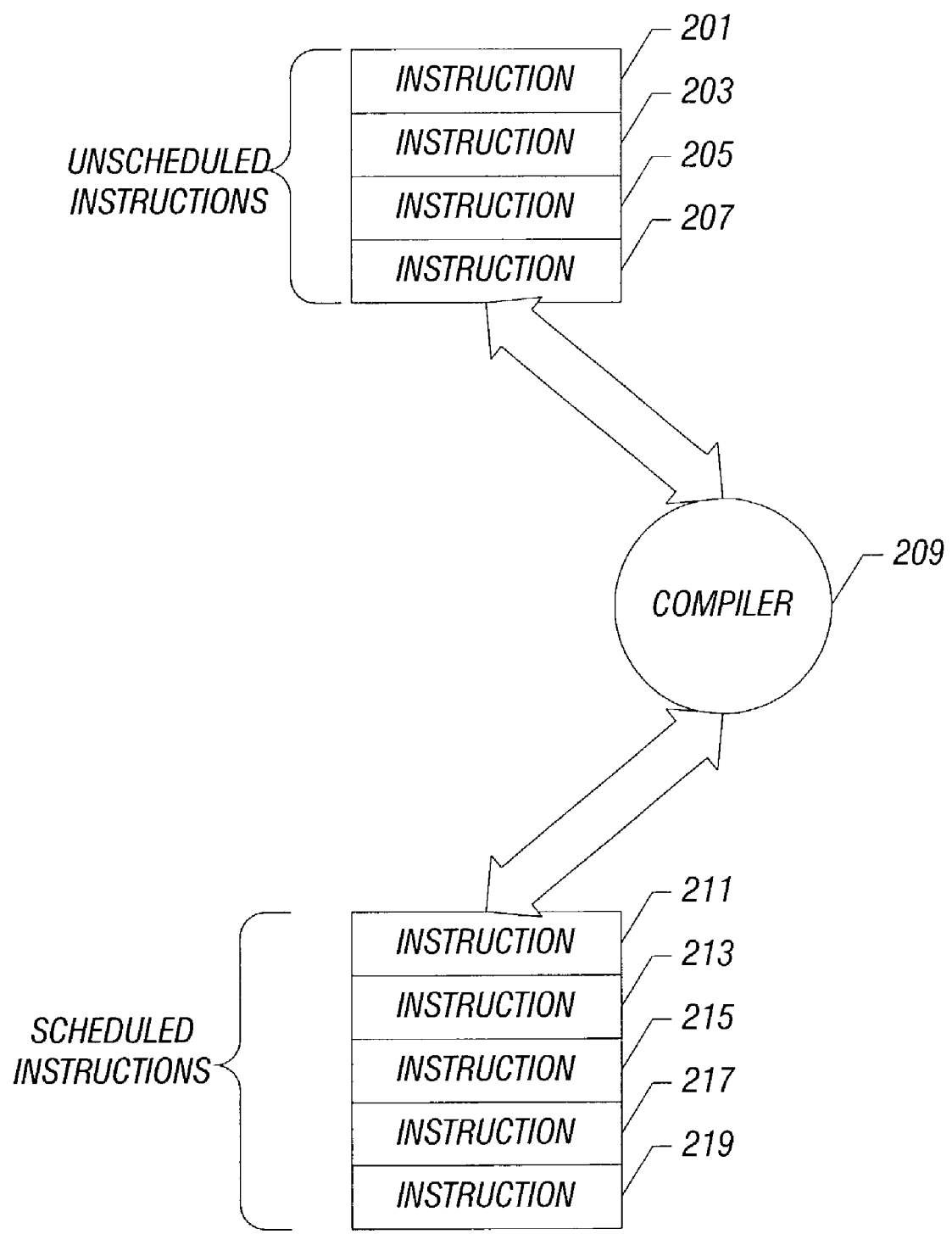
FIG. 2 illustrates a data flow diagram flow generation of executable code according to embodiments of the present invention.

Referring now to FIG. 2, a compiler 209 may provide register allocation, instruction selection and scheduling, and other functions that may be necessary or useful in the operation of the compiler. The compiler 209 may be the entire compiler, such as 26, or the "backend" of compiler 26, as may be the case for different embodiments. Unscheduled instructions 201-207 may be utilized as an input to the compiler 209, which may subsequently generate scheduled instructions 211-219. In operation, the compiler scheduler 209 may deschedule instructions and place the descheduled instructions onto the unscheduled instruction list for reasons of efficiency or other reasons that may be discussed below. The unscheduled instructions 201-207 and the scheduled instructions 211-219 may be considered an intermediate representation (IR) of the code being compiled for a target processor architecture.

Figure 3:
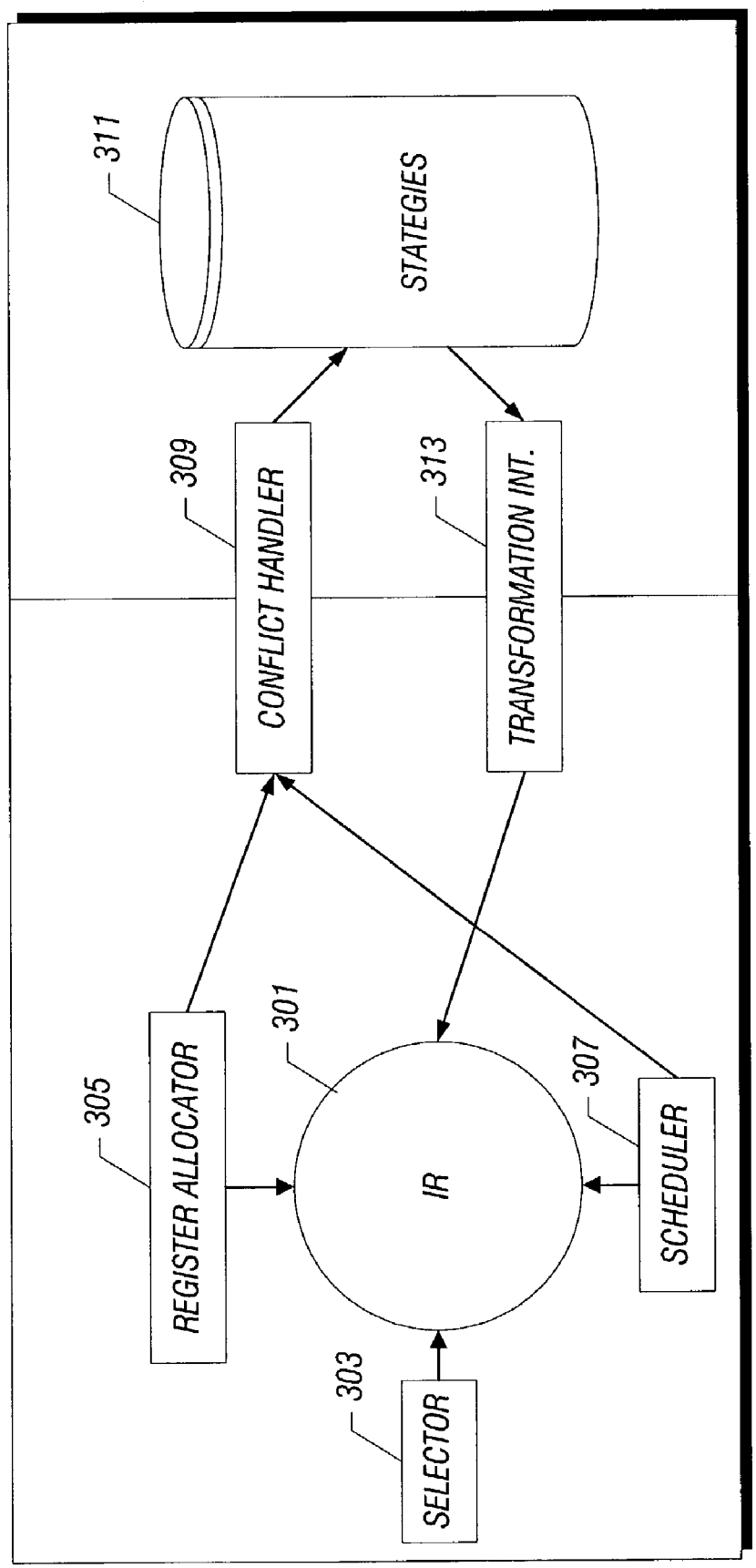
FIG. 3 illustrates a block diagram of a compiler according to embodiments of the present invention.

Referring now to FIG. 3, an intermediate representation IR 301 may be generated as was described previously. An instruction selector 303 may select an unscheduled instruction to be scheduled. Register allocator 305 may determine when a register or registers may be allocated to unscheduled instructions that are being currently processed. In addition, the register allocator may be utilized to determine when values within a register may be transferred between memory and the register file (registers in the architecture) as may be required to generate the IR 301.

Scheduler 307 may be utilized to map selected operations to the appropriate functional units of the architecture so that, among other goals, the order of execution minimizes execution time while it may preserve the semantics of the original program. The scheduler 307 may also attempt to maintain a high utilization of the functional units of the target processor architecture.

The selector 303, register allocator 305, and scheduler 307 may take unscheduled instructions and schedule those instructions. Should conflicts not exist, the IR 301 may become a contiguous code segment that represents an entire code program with calls, if required, to libraries or other external code structures.

However, conflicts may occur due to registers being already allocated when a new instruction is selected that may require a register. In addition, another conflict that may occur is when the scheduler 307 attempts to schedule an instruction when a particular functional unit in the target architecture is already committed. For example, an instruction may call for a multiplication process to be performed by the target architecture that may, in some embodiments, be implemented by the integer functional unit in the target architecture. If the add function in the integer functional unit of the target architecture is currently committed, then a conflict may exist which may need to be resolved before the current unscheduled instruction may be scheduled and become part of the IR 301. Other conflicts besides register or scheduler conflicts may also occur and may also need to be resolved by a conflict handler.

Conflict interface 309 may provide a means for resolving conflicts from the register allocator 305 or scheduler 307. A conflict interface 309 may, in some embodiments, interface to code that implements conflict strategies 311 that may resolve current conflicts encountered in processing the current IR 301. Additionally, in some embodiments, a transformation interface 313 may be provided to provide a link to code that may provide for analysis of the efficiency of the IR generated.

Figure 4:
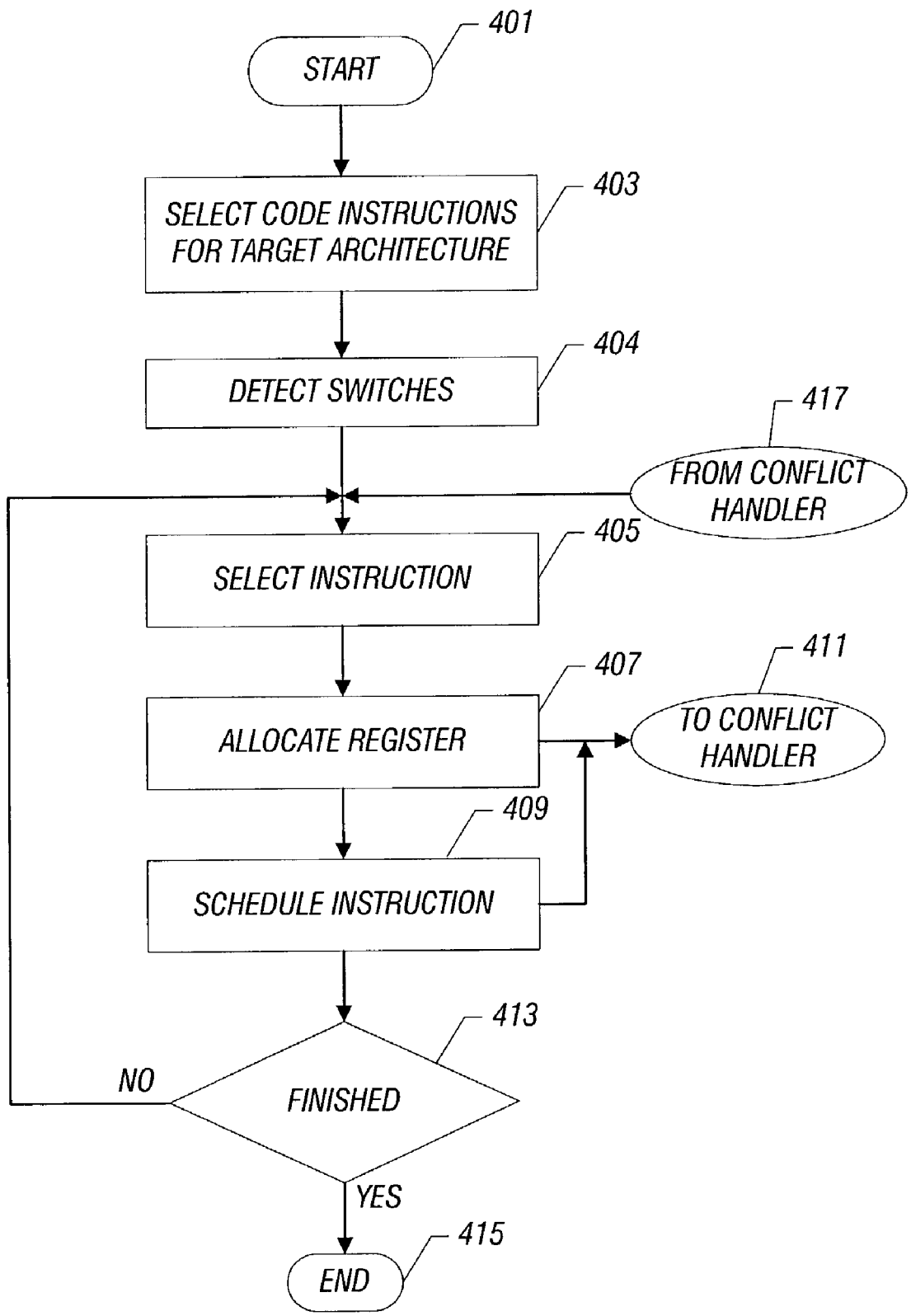
FIG. 4 illustrates a flowchart of a compiler feature according to embodiments of the present invention.

Referring now to FIG. 4, a code segment that may implement the framework illustrated in FIG. 3 is shown. Initially, in some embodiments, a compiler may select code instructions for a target architecture, 403. For example, if the target architecture is an Intel processor, such as an I860 processor manufactured by the Intel Corporation, the instructions that may be executed by the I860 may be selected for use in converting unscheduled instructions to scheduled instructions. Alternatively, other target architectures may be selected in which case code instructions for that particular architecture may be selected. In addition, the user may, in some embodiments, have the option to set switches during the invoking of the compiler. The compiler may detect switches, 404, that have been set and modify the operation of the compiler based, in part, on the switches that may have been set. For example, the user of the compiler may have the option to select conflict strategies or combinations of strategies to resolve conflict detected during the operation of the compiler. In addition, the user may be able to select one or more transformations. These switches may be detected at run-time and provide a user with a modular and flexible compiler.

At block 405, the select instruction function may select an unscheduled instruction such as one of 201-207. The selected instruction may be subsequently processed to become a scheduled instruction in the IR 301.

In block 407, the allocate register function may attempt to allocate a register to the unscheduled instruction presently being processed. If an appropriate register is free to be allocated, then the instruction may be submitted for scheduling, 409. However, if an appropriate register is not currently available, then a conflict may exist, and a conflict handler may be called, 411.

An attempt to schedule the unscheduled instruction may be made, 409. If the instruction may be scheduled, then an examination 413 may be performed to determine whether all unscheduled instructions have been scheduled. However, if an instruction may not be currently scheduled because the resources in the target architecture that may be required to schedule the instruction are already committed, then a conflict may exist and a call to the conflict handler may be performed, 411.

After a call has been made to the conflict handler, such as in block 411, the conflict handler may resolve the conflict and may return execution, 417, to the code segment so that the IR may continue to be processed as required or useful.

Figure 5:
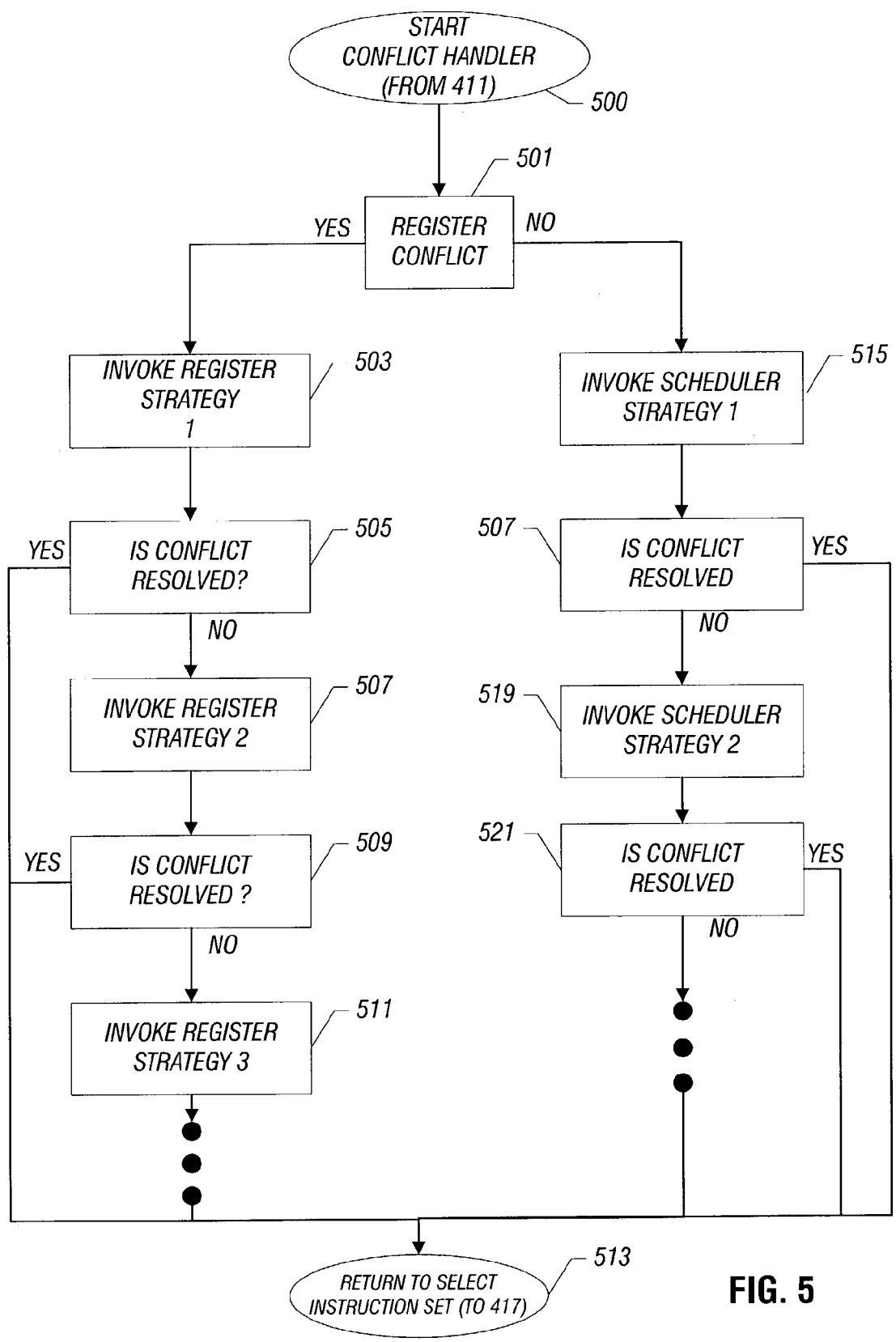
FIG. 5 illustrates a flowchart of a conflict handler in accordance with embodiments of the present invention.

Referring now to FIG. 5, a conflict handler, implementing conflict resolution code according to some embodiments, is illustrated. Having been invoked by a conflict, such as described in association with FIG. 4, the conflict handler may determine what kind of conflict has occurred. For example, in block 501, a determination may be made as to whether the conflict was a register conflict.

If a register conflict has been detected, then the process may invoke a register strategy such as register strategy 1 in block 503. The strategy may, in some embodiments, resolve the register conflict by determining a register that may be spilled at the least cost. In some embodiments, spilling a register entails storing the current value in the register into a memory location from where it can be restored at some later point in time. The cost of spilling a register may be measured differently in different embodiments.

By way of example, the cost may be considered to be the increase, in execution latency for the overall result in IR 301. In other embodiments, the costs may be measured by determining the idle time of a particular functional unit in the target architecture. Other costs or a combination of costs may be considered to make the determination as to which register, if any, to spill.

After register strategy 1 has been performed or not performed, a test is made to determine whether the conflict is resolved in block 505. If the conflict is resolved, then the conflict handler may return to the instruction segment that called it in block 513. If register strategy 1 was unsuccessful, then register strategy 2 may be invoked at block 507. This register strategy 2, 507, may be invoked because the cost to implement a register spill, such as may be implemented by register strategy 1, was higher than a particular threshold or other reason.

Register strategy 2 may attempt to resolve a register conflict by undoing scheduling for instructions as required to free a register. Should this strategy achieve the desired result, i.e., the cost may be acceptable, then the scheduled instructions may be unscheduled and added to the unscheduled instruction list such as 201-207. After strategy 2 is invoked, a test may be made, 509, to determine if the register conflict was resolved. If the conflict is resolved then the program may return to the code segment that called the conflict handler in block 513.

If register strategy 2 may not have resolved the conflict for reasons of the costs exceeding a threshold or other reason, then a register strategy 3, 511, may be invoked to resolve the conflict. Register strategy 3 may apply a different strategy than was applied prior by registers strategies 1 or 2, 503 and 507, and in some embodiments, may attempt to resolve the register conflict by changing the order in which instructions are added to the IR 301. For example, a source code (not shown) may be parsed into nodes where each node is a discrete code segment. The ordering of these nodes may be changed by register strategy 3, 511, as may be useful to resolve a register conflict.

Of course, additional register strategies may be invoked as required or useful to resolve register conflicts.

If, at function 501, it may be determined that the conflict is not a register conflict, then a scheduler strategy, such as scheduler strategy 1, 515, may be invoked. Scheduler strategy 1 may be any useful strategy that may resolve a scheduling issue. By way of example, scheduler strategy 1 may change the implemented instructions to utilize a function in the target architecture that is not currently committed. As a particular example, if a target architecture has a multiplication function and the instruction currently being added to the IR 301 is a multiply function, then instructions that invoke the target architecture's multiplier may be switched for instructions that may be otherwise more efficient, such as a shift and add process.

After scheduler strategy 1 has been invoked, a test may be made, 507, to determine if the conflict is resolved. If the conflict is resolved, then the program may return to the code segment that called it, 513. If the conflict may not have been resolved, scheduler strategy 2, 519, may be invoked which may implement a different strategy than schedule strategy 1 to attempt to resolve the scheduler conflict. Scheduler strategy 2, 519, may be invoked if scheduler strategy 1 was either unsuccessful in resolving the conflict or the costs of implementing scheduler strategy 1 may have been higher than a threshold.

As described before, after scheduler strategy 2 has been performed, a test may be made, 521, to determine if the conflict is resolved. If the conflict is resolved, then the conflict handler may return to the code segment that called it, 513, otherwise other scheduler strategies may be invoked as required or useful.

Of course, other conflicts, in addition to register and scheduler conflicts, may occur. These other conflicts, if any, may be handled by adding appropriate strategies to the conflict handler.

Figure 6:
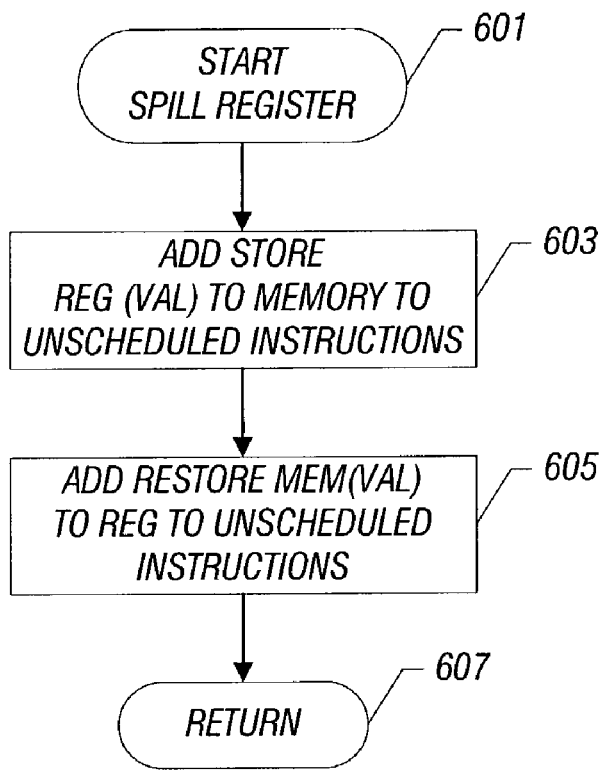
FIG. 6 illustrates a flowchart for a spill register code segment according to embodiments of the present invention.

Referring now to FIG. 6, a register spill flow diagram is depicted. The instructions 603 and 605 may be added to the unscheduled instructions such as instructions 201-207 for later scheduling. Instructions 603 and 605 may, when executed, take the value of a register and store it into a memory location to, for example, free up a register for allocation. At a subsequent period of time, instruction 605, when executed, may restore to the register the previous value such that the value may be used in subsequent processing. This spill code segment 601-607, may be utilized, for example, to implement strategy 1, 503, as was described in association with FIG. 5.

Figure 7:
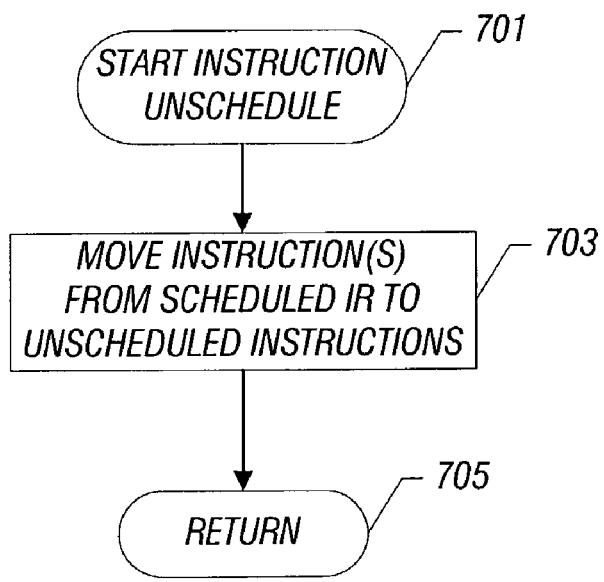
FIG. 7 illustrates a flowchart of an instruction on scheduling algorithm according to embodiments of the present invention.

Referring now to FIG. 7, a flowchart that may be utilized for a scheduler strategy 1, 515, is illustrated. Once invoked, 701, the strategy may move instructions, 703, from the scheduled instructions group, for example, 211-219 and add them to the unscheduled instructions such as instructions 201-207. This process may be continued until the resource needed to schedule the current unscheduled instruction may be scheduled. Upon completion, the code segment may return, 705, to the code segment that called it.

Figure 8:
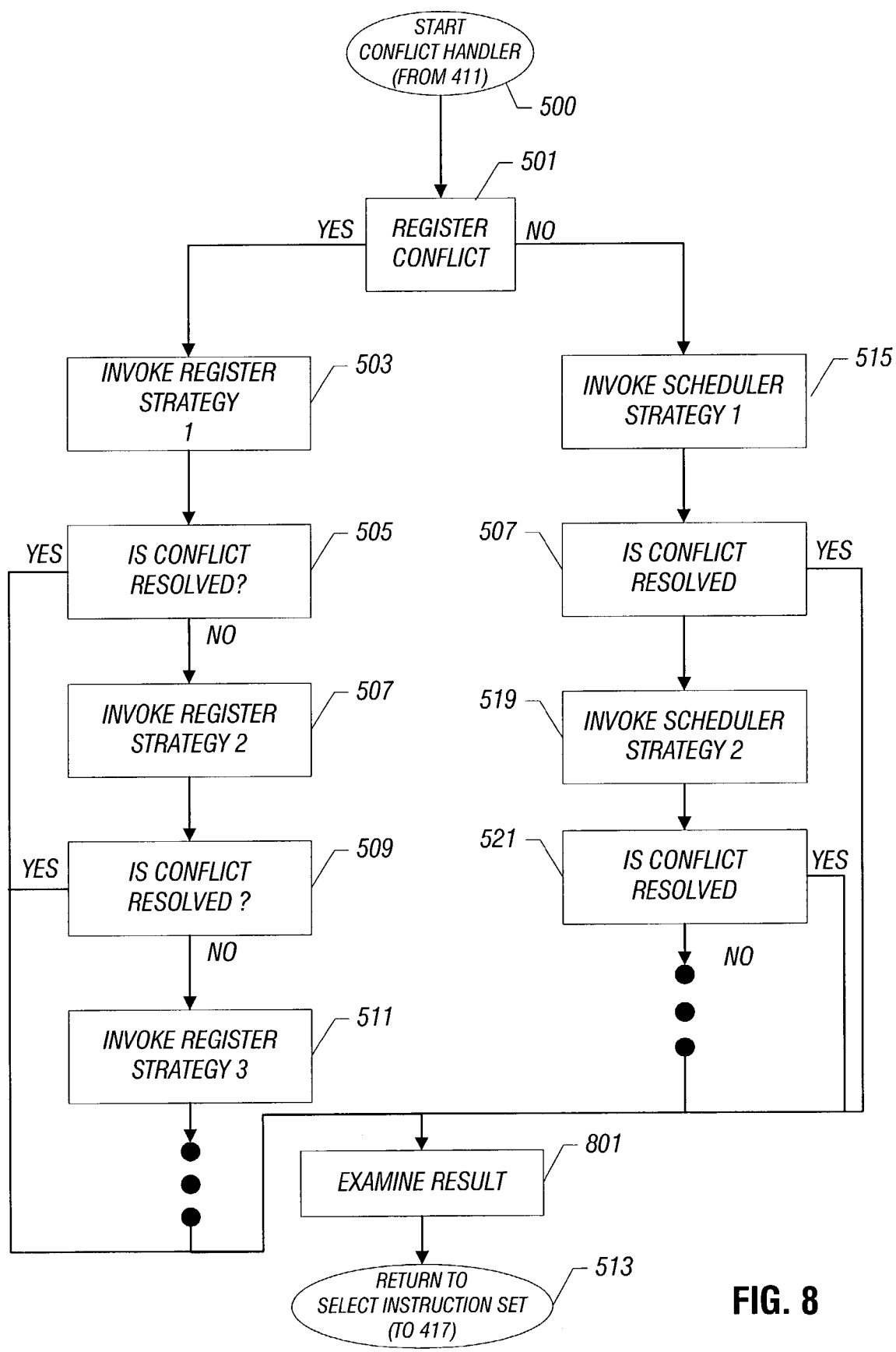
FIG. 8 illustrates a block diagram of a conflict handler according to embodiments of the present invention.

Referring now to FIG. 8, a flowchart for a conflict handler, according to some embodiments, is depicted. The function of the scheduler may be as described previously in association with FIG. 5 for like numbered functions. An additional function, 801, may be incorporated to examine the results of the conflict resolution as resolved by the register strategies, the scheduler strategies, or both. This analysis may, in some embodiments, measure the effectiveness of a result by examining the produced IR, the result on the target architecture, or both.

By way of example, the examined result function 801 may analyze the utilization of functional units of the target architecture. Should a functional unit be detected as idle for a period of time exceeding a threshold, then changes may be implemented in the IR 301, as may be required or useful, to utilize the idle function in the target architecture. Of course, other analysis and results may be utilized.

By integrating the register allocation, instruction scheduling, and code selection functions, such as 305, 307, and 303, to generate an IR 301, an efficient IR implementation may be generated that may be more efficient than performing these functions separately. Decisions made during the code selection and register allocation may be considered and may not constrain the ability of the scheduling function to utilize available machine resources. Additionally, the strategies, 311, may be modular such that different strategies may be implemented, added, or subtracted, from a compiler in a modular and cost effective way. Also, the transformation interface 313 may also be modular such that different transformations may be supplied as needed or useful in a modular and cost effective way.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving unscheduled instructions in a computational device;
selecting conflict resolution code based, in part, on switch settings provided by a user of the computational device with regard to a plurality of conflict strategies to resolve a conflict in the unscheduled instructions; and
scheduling the received unscheduled instructions utilizing the conflict resolution code to resolve the conflict according to successive ones of the plurality of conflict strategies if the preceding one of the plurality of conflict strategies is unsuccessful, until the conflict is resolved, wherein a first one of the plurality of conflict strategies includes a register spill based on analysis of a cost of the register spill to a threshold, a second one of the plurality of conflict strategies includes unscheduling at least one previously scheduled instruction based on analysis of a cost of the unscheduling, and a third one of the plurality of conflict strategies includes reordering nodes of code and associating the scheduled instructions with at least one instruction in an instruction set of the computational device.

2. The method of claim 1 further comprising utilizing the conflict resolution code to resolve scheduling conflicts.

3. The method of claim 2 further comprising utilizing the conflict resolution code to resolve a scheduling conflict associated with a functional unit in a target architecture.

4. The method of claim 3 further comprising utilizing the conflict resolution code to resolve a scheduling conflict by, in part, associating the scheduled instruction with another instruction in the instruction set.

5. The method of claim 3 further comprising utilizing the conflict resolution code to resolve a scheduling conflict by, in part, unscheduling previously scheduled instructions.

6. The method of claim 1 further comprising utilizing the conflict resolution code to resolve out of register conflicts.

7. The method of claim 6 further comprising utilizing the conflict resolution code to resolve an out of register conflict by, in part, storing the content of a register in a memory.

8. The method of claim 6 further comprising utilizing the conflict resolution code to resolve an out of register conflict by, in part, unscheduling a previously scheduled instruction.

9. The method of claim 6 further comprising utilizing the conflict resolution code to resolve an out of register conflict by, in part, reordering nodes of code.

10. The method of claim 1 further comprising utilizing the conflict resolution code to resolve a conflict based, in part, on a latency of the scheduled instructions.

11. The method of claim 1 further comprising scheduling the unscheduled instructions based, in part, on an analysis of the scheduled instructions.

12. The method of claim 11 further comprising selecting the analysis utilized based, in part, on the switch settings.

13. A system comprising:
a compiler coupled to a DRAM memory and wherein the compiler includes:
a conflict resolution code having a plurality of conflict resolution options; and
wherein a conflict resolution option is selected from the plurality of conflict resolution options, in part, based on switch settings provided by a user during invocation of the compiler, the switch settings with regard to the plurality of conflict resolution options to resolve a conflict in unscheduled instructions detected during execution of the compiler and to schedule the unscheduled instructions utilizing the conflict resolution code, to resolve the conflict according to successive ones of the plurality of conflict resolution options if the preceding one of the plurality of conflict resolution options is unsuccessful, until the conflict is resolved, wherein a first one of the plurality of conflict resolution options includes a register spill based on analysis of a cost of the register spill to a threshold, a second one of the plurality of conflict resolution options includes unscheduling at least one previously scheduled instruction based on analysis of a cost of the unscheduling, and a third one of the plurality of conflict resolution options includes reordering nodes, and associate the scheduled instructions with at least one instruction in an instruction set.

14. A system as in claim 13 wherein the conflict resolution code is to resolve scheduling conflicts.

15. A system as in claim 14 wherein the conflict resolution code is to resolve a scheduling conflict associated with a functional unit in a target architecture.

16. A system as in claim 15 wherein the conflict resolution code is to resolve the scheduling conflict by, in part, changing an instruction set instruction associated with an unscheduled instruction.

17. A system as in claim 13 wherein the conflict resolution code is to resolve out of register conflicts.

18. A system as in claim 17 wherein the conflict resolution code is to resolve an out of register conflict by, in part, storing the content of a register in a memory.

19. A system as in claim 17 wherein the conflict resolution code is to resolve an out of register conflict by, in part, unscheduling an instruction scheduled by the compiler.

20. A system as in claim 17 wherein the conflict resolution code is to resolve an out of register conflict by, in part, reordering nodes of code.

21. A system as in claim 13 wherein the compiler is to schedule instructions based, in part, on an analysis of scheduled instructions.

22. A machine-readable medium that provides instructions that, when executed by a set of one or more processors, enable the set of processors to perform operations comprising:
receiving unscheduled instructions;
selecting conflict resolution code based, in part, on switch settings provided by a user of a system including the set of processors, the switch settings with regard to a plurality of conflict strategies to resolve a conflict in the unscheduled instructions; and
scheduling the received unscheduled instructions utilizing the conflict resolution code, to resolve the conflict according to successive ones of the plurality of conflict strategies if the preceding one of the plurality of conflict strategies is unsuccessful, until the conflict is resolved, wherein a first one of the plurality of conflict strategies includes a register spill based on analysis of a cost of the register spill to a threshold, a second one of the plurality of conflict strategies includes unscheduling at least one previously scheduled instruction based on analysis of a cost of the unscheduling, and a third one of the plurality of conflict strategies includes reordering nodes of code, and associating the scheduled instructions with at least one instruction in an instruction set.

23. The machine-readable medium of claim 22 wherein the operations comprise utilizing the conflict resolution code to resolve scheduling conflicts.

24. The machine-readable medium of claim 22 wherein the operations comprise utilizing the conflict resolution code to resolve out of register conflicts.

25. The machine-readable medium of claim 22 wherein the operations comprise scheduling instructions based, in part, on an analysis of scheduled instructions.

26. The machine-readable medium of claim 25 wherein the operations comprise scheduling the instructions based, in part, on the analysis of scheduled instructions by an analyzer selected, in part, by the switch settings provided by the user.

* * * * *